United States Patent
Park et al.

(10) Patent No.: US 9,157,473 B2
(45) Date of Patent: Oct. 13, 2015

(54) THRUST BEARING AND COMBO BEARING

(71) Applicant: KOREA INSTITUTE OF MACHINERY & MATERIALS, Daejeon (KR)

(72) Inventors: Cheol-Hoon Park, Daejeon (KR); Sang-Kyu Choi, Daejeon (KR); Doo Euy Hong, Daejeon (KR); Tae Gwang Yoon, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 14/155,455

(22) Filed: Jan. 15, 2014

(65) Prior Publication Data

US 2014/0199006 A1    Jul. 17, 2014

(30) Foreign Application Priority Data

Jan. 16, 2013   (KR) .................. 10-2013-0005024
Jan. 16, 2013   (KR) .................. 10-2013-0005126

(51) Int. Cl.
| | | |
|---|---|---|
| F16C 17/04 | (2006.01) | |
| F16C 17/10 | (2006.01) | |
| F16C 33/10 | (2006.01) | |
| F16C 27/02 | (2006.01) | |

(52) U.S. Cl.
CPC .............. *F16C 17/10* (2013.01); *F16C 17/042* (2013.01); *F16C 27/02* (2013.01); *F16C 33/101* (2013.01); *F16C 2360/23* (2013.01)

(58) Field of Classification Search
CPC ...... F16C 17/024; F16C 17/042; F16C 17/10; F16C 27/02; F16C 17/26; F01D 25/164
USPC ........... 384/99, 103–106, 107, 114, 119, 123, 384/125, 121, 124; 417/321
See application file for complete search history.

(56) References Cited

U.S. PATENT DOCUMENTS

| | | | | | |
|---|---|---|---|---|---|
| 4,208,076 | A | * | 6/1980 | Gray et al. ................. | 384/105 |
| 4,277,112 | A | * | 7/1981 | Heshmat .................... | 384/124 |
| 4,296,976 | A | * | 10/1981 | Heshmat .................... | 384/99 |
| 4,621,930 | A | * | 11/1986 | Gu et al. .................... | 384/105 |
| 4,668,106 | A | * | 5/1987 | Gu ............................. | 384/105 |
| 4,682,900 | A | * | 7/1987 | Gu ............................. | 384/105 |
| 5,498,082 | A | * | 3/1996 | Nadjafi ....................... | 384/105 |
| 5,540,505 | A | * | 7/1996 | Struziak ..................... | 384/105 |
| 5,833,369 | A | * | 11/1998 | Heshmat ..................... | 384/105 |

(Continued)

FOREIGN PATENT DOCUMENTS

| | | |
|---|---|---|
| JP | 2004-183830 | 7/2004 |
| KR | 10-2000-0050707 | 8/2000 |

(Continued)

OTHER PUBLICATIONS

Kim, Tae Young, mater thesis, Korea University, "Enhancement on Damping Characteristics of the Air Foil Bearings with Metal Mesh Structure" (Dec. 2010).

*Primary Examiner* — Marcus Charles
(74) *Attorney, Agent, or Firm* — Lex IP Meister, PLLC

(57) ABSTRACT

A thrust bearing comprising a damper body including a body part and protrusions axially protruding at predetermined areas on the body part with flat tops, and thrust top foils each having a contact portion that is in surface contact with the tops of the protrusions.

5 Claims, 13 Drawing Sheets

(56) References Cited

U.S. PATENT DOCUMENTS

| | | | |
|---|---|---|---|
| 6,354,741 B1 * | 3/2002 | Saville et al. | 384/105 |
| 6,752,533 B2 * | 6/2004 | Saville et al. | 384/105 |
| 6,848,828 B2 * | 2/2005 | Nishijima et al. | 384/106 |
| 7,948,105 B2 * | 5/2011 | Agrawal et al. | 384/105 |
| 2008/0260308 A1 * | 10/2008 | Struziak et al. | 384/105 |
| 2009/0039740 A1 * | 2/2009 | Sortore et al. | 310/68 B |
| 2011/0243762 A1 * | 10/2011 | Daikoku et al. | 384/105 |
| 2014/0321779 A1 * | 10/2014 | Park et al. | 384/105 |

FOREIGN PATENT DOCUMENTS

| | | |
|---|---|---|
| KR | 10-2001-0063915 | 7/2001 |
| KR | 10-2007-0058853 | 6/2007 |
| KR | 10-2012-0009724 | 2/2012 |
| KR | 10-2012-0017637 | 2/2012 |
| KR | 10-2012-0063111 | 6/2012 |
| WO | 2010/122450 | 10/2010 |

* cited by examiner

THRUST BEARING AND COMBO BEARING

CROSS-REFERENCE TO RELATED APPLICATION

This application claims priority to and the benefit of Korean Patent Application No. 10-2013-00005024 and 10-2013-0005126 filed in the Korean Intellectual Property Office on Jan. 16, 2013, and Jan. 16, 2013, the entire contents of which are incorporated herein by reference.

BACKGROUND OF THE INVENTION (a) Field of the Invention

The present invention relates to a bearing that is mounted on a rotary shaft of a rotator and supports the rotary shaft perpendicular to or in parallel with (axially) the rotary shaft.

(b) Description of the Related Art

In parts (a rotary shaft and a moving shaft) that make motions such as rotation or reciprocation, various types of bearings are provided to solve problems such as wear or damage of the parts, noise, and waste of energy due to friction that may be generated in the motions of the parts. The bearing on which loads are applied perpendicular to the rotational axis is called a radial bearing or a journal bearing (for sliding bearings), and the bearing on which loads are applied in parallel with the rotational axis (that is, axially) is called a thrust bearing. Most bearings are thrust bearing, and roller bearings are classified as thrust bearings when axial loads are applied over 45 degrees and as radial bearings in remaining cases.

A thrust bearing is mounted on rotary shafts because axial vibration is generated in a rotator that rotates at a high speed. In general, for devices including various rotary shafts, such as power generators or turbines, thrust bearings for reducing axial vibration are generally used with radial bearings for reducing radial vibration. Particularly, the rotators that rotate at high speeds need to be used at high temperature and to be able reduce noise because friction necessarily increases temperature. Further, the rotators require high durability to prevent bearings from being damaged due to axial loads. Because of those conditions, fluid bearings have been generally used as thrust bearings or bearings that are at least supplied with fluid that is a lubricant have been widely used.

Further, recently, a divisional type of power generation technology has been more commercialized all over the world due to an increase in costs for initial installations because the cost per kilowatt for transmitting power is high in centralized systems, and there is a need for inexpensive basic structures to distribute generated power to consumers. With this tendency, gas microturbines that are small gas turbines capable of generating power at specific sites are being increasingly used. Gas microturbines generally have an output of less then 1 kW or of hundreds of kilowatts. Those gas microturbines are being increasingly developed and used for divisional power generation and small-scale cogeneration systems because of technical advantages and environmental friendliness.

It has been known that the rotary shafts of small devices such as the gas microturbines usually rotate at high speeds of 10,000~400,000 rpm in order to achieve desired output. Radial bearings and thrust bearings are necessary for such small devices. In particular, for small high-speed rotators such as gas microturbines of which the necessity for and the actual use of are increasing, there is an increasing need for bearings that can be reduced in size and weight while satisfying the conditions of a non-contact type and no oil supply, in addition to the conditions required for bearings, that is, reduction of axial vibration, usability in high-temperature environments, and high durability.

In general, the bearing systems of rotators are composed of a radial bearing that supports radial loads and a thrust bearing that support axial loads, as described above. However, there is a problem in that the bearing systems on rotators necessarily increase in volume, because the bearings are separate parts. The larger the volume of the bearing systems, the larger the length of rotators becomes, and accordingly, the primary bending mode (critical speed) of the rotators is lowered, which causes a problem in that the stability of small rotators is considerably decreased during high-speed rotation.

Further, in the process of separately manufacturing the two types of bearings and assembling them, a specific back plate for mounting the thrust bearing is needed and there is a need of a process for fitting the degree of precision in assembling, thereby causing the assembly process to be complicated. In addition, as described above, in order to satisfy the conditions of non-contact type and no oil supply, it is difficult to use ball bearings and sliding bearings, which are widely used, and it is required to use air foil bearings and electromagnet bearings, but those bearings have the following problems. The air foil bearings are practically difficult to use, particularly for a thrust bearing, due to very poor structural durability, and there is a limit in reducing the size of a bump foil. The electromagnetic bearings have a problem in that the configuration of the devices is complicated and expensive, so they are not economical.

Further, the following problems have been generated with the progress of studies for improving the shapes of small rotators such as those used in the gas microturbines described above. FIGS. 8A and 8B are views showing the arrangement of bearings on a rotary shaft coupled with impellers in the related art. In the related art, a turbine impeller 2 and a compressor impeller 3 are separately fitted on a rotary shaft 1. That is, the impellers 2 and 3 are fitted at an end portion of the rotary shaft 1 and then fixed by thread fasteners. In order to combine the rotary shaft-impeller assembly and a bearing 10 that is generally used in the related art, the bearing 10 is also fitted when the impellers 2 and 3 are fitted onto the rotary shaft 1.

However, in the rotator having this configuration, imbalance and bending between the rotary shaft rotating at a high speed and the parts on the end of the rotary shaft are problematic. As a way of solving the imbalance and bending during high-speed rotation, a technology of manufacturing a rotary shaft and impellers as one unit, breaking from the way of separately manufacturing a rotary shaft, a compressor impeller, and a turbine impeller and then assembling them, has been studied in recent years. However, with design and development of a rotator configured by integrating a rotary shaft and impellers due to the problem of imbalance that is generated when a rotary shaft and impellers are combined, there is another problem in that it is very difficult to combine the bearings of the related art with the integrated impellers and rotary shaft.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a non-contact type and no-oil-supply type of thrust bearing having advantages of being able to be reduced in size and weight such that it can be used for small high-speed rotators with a simple structure and a low manufacturing cost.

The present invention has been made in an effort to provide a combo bearing having advantages of considerably reducing the volume of a space where a bearing is disposed, by implementing the functions of a radial bearing and a thrust bearing with a single part.

The present invention has been made in an effort to provide a combo metal mesh foil bearing having advantages of having high durability and a simple configuration of parts, and being able to be easily assembled at any position on a rotator having a complicated and difficult shape.

An exemplary embodiment of the present invention provides a thrust bearing that is mounted on a rotary shaft of a rotator and supports the rotary shaft in a parallel direction (axially), and that includes: a damper body including a body part and protrusions axially protruding at predetermined areas on the body part with flat tops; and thrust top foils each having a contact portion that is in surface contact with the tops of the protrusions.

The damper body may further include grooves axially recessed on one side of the body part, and the thrust top foil may further have a fixing portion inserted and fixed in the groove and a connecting portion connecting the contact portion and the fixing portion.

The damper body may be formed by circumferentially arranging unit collars composed of the body part, the protrusion, and the groove, and the thrust top foils may be provided at the same number as the unit collars.

The fixing portion may be fitted and fixed in the groove or may be inserted and bonded in the groove.

The thrust bearing may further include fixing pins fitted in the grooves to support the fixing portions in the grooves.

The damper body may be made of a metal mesh.

The thrust top foil may be formed by bending a thin plate.

Another exemplary embodiment of the present invention provides a combo bearing that is mounted on a rotary shaft of a rotator and supports the rotary shaft perpendicularly to (radially) or in parallel with (axially) the rotary shaft, and that includes: a damper body including a body part having a through-hole at the center through which the rotary shaft passes, and protrusions axially protruding at predetermined areas on the body part with flat tops; thrust top foils each having a contact portion that is in surface contact with the tops of the protrusions; and a radial top foil covering the rotary shaft and disposed along the inner side of the through-hole of the damper body.

The damper body may further include grooves axially recessed on one side of the body part, and the thrust top foil may further have a fixing portion inserted and fixed in the groove and a connecting portion connecting the contact portion and the fixing portion.

The damper body may be formed by circumferentially arranging unit collars composed of the body part, the protrusion, and the groove, and the thrust top foils may be provided at the same number as the unit collars.

The damper body may have unit collars composed of the body part, the protrusion, and the groove, and is axially formed on at least one or more sides.

The fixing portion may be fitted and fixed in the groove, or may be inserted and bonded in the groove.

The combo bearing may further include fixing pins fitted in the grooves to support the fixing portions in the grooves.

The damper body may further have a slot radially recessed from the inner side of the through-hole, and one end of the radial top foil may form an insert fitted and fixed in the slot.

The damper body may be made of a metal mesh.

The thrust top foil or the radial top foil may be formed by bending a thin plate.

The damper body may be composed of at least two or more separate parts that are radially divided and separated.

The combo bearing may further have a slot formed by a gap between the separate parts, and one end of the radial top foil may form an insert fitted and fixed in the slot.

The combo bearing may further have a gap filler formed in a thin plate shape and fitted in a gap, where the insert is not fitted, between the separate parts.

The gap filler may be formed with the same thickness or be made of the same material as the radial top foil.

The combo bearing may further include a housing surrounding the rotary shaft and accommodating the damper body, the thrust top foil, and the radial top foil.

The rotary shaft may be a rotary shaft of an impeller-rotary shaft-integrated rotator in which the rotary shaft and at least one or more impellers are integrated, and the outer diameter of the damper body and the inner diameter of the housing may be larger than the outer diameters of the impellers.

According to an exemplary embodiment of the present invention, by supporting the top foils of a thrust bearing with a material formed by pressing metal having constant density, there is a large effect with which it is possible to improve the problem of vulnerability to axial loads and considerably increase durability in comparison to the related art, by making a thin plate function as a damper in the existing air foil thrust bearings. Further, since there is no need to manufacture a bump foil, unlike the existing air foil thrust bearings, there is the effect that the structure is simplified and manufacturing is easy, and accordingly, the present invention can be easily used for small rotators, such that there is a large effect that it is possible to increase the applicability in comparison to the related art.

The details are as follows. In a device in which a rotary shaft equipped with parts such as a compressor and turbine impellers, including a gas microturbine, rotates at a high speed, axial load and vibration are serious problems. The existing air foil thrust bearings have a problem in that they cannot be applied to the device because they are vulnerable to axial loads, as described above. However, according to an exemplary embodiment of the present invention, there are the advantages that a structure can be easily manufactured in a simple structure while the problems of the related art are eliminated, the size and weight can be reduced, the costs for manufacturing and maintaining are reduced, and it can be used under high-temperature environments with high durability, so it can be used for the device without a problem.

According to another exemplary embodiment of the present invention, for a rotator having a radial bearing and a thrust bearing in the related art, the combo bearing of the present invention that can achieve the functions of a radial bearing and a thrust bearing as a single part is provided, such that there is the effect that it is possible to reduce the length of a rotator by as much as the length is increased for ensuring spaces for two different types of bearings in the related art. Obviously, as the length of a rotator is minimized, there is also the effect that the volume of the entire system can be reduced. According to the present invention, above all, the length of a rotator is reduced and the critical speed of a rotator in a bending mode increases, such that there is also the effect that it is possible to increase the range of operation speed in which the rotator can stably operate.

Further, by supporting the top foils of a bearing with a material formed by pressing metal having constant density, there is a large effect that it is possible to improve the problem of vulnerability to loads and increase durability considerably in comparison to the related art, by making a thin plate function as a damper in the existing air foil bearings. Further, according to the present invention, since there is no need to manufacture a bump foil, unlike the existing air foil bearings, there is the effect that the structure is simplified and manufacturing is easy, and accordingly, the present invention can be easily used for small rotators, such that there is a large effect that it is possible to increase the applicability in comparison to the related art. That is, by using a metal mesh damper, there are the advantages that a structure can be easily manufactured in a simple structure while the problems of the related art are eliminated, the size and the weight can be reduced, the costs for manufacturing and maintaining are reduced, and it can be used under high-temperature environments with high durability.

Further, according to an exemplary embodiment of the present invention, there is a large effect that it is possible to solve the problem that it is difficult to dispose bearings due to the structure in which the existing bearings cannot be fitted from any one side, in an impeller-rotary shaft-integrated rotator in which impellers and a rotary shaft are integrated. That is, the bearing of the present invention can be divided, such that there is the effect that the bearing can be combined at any desired position no matter how complicated the shape of a rotator is, in addition to an impeller-rotary shaft-integrated rotator.

DETAILED DESCRIPTION OF THE EMBODIMENTS

A thrust bearing and a combo bearing according to the present invention which have the configurations described above will be described hereafter with reference to the accompanying drawings.

Figure 1A:
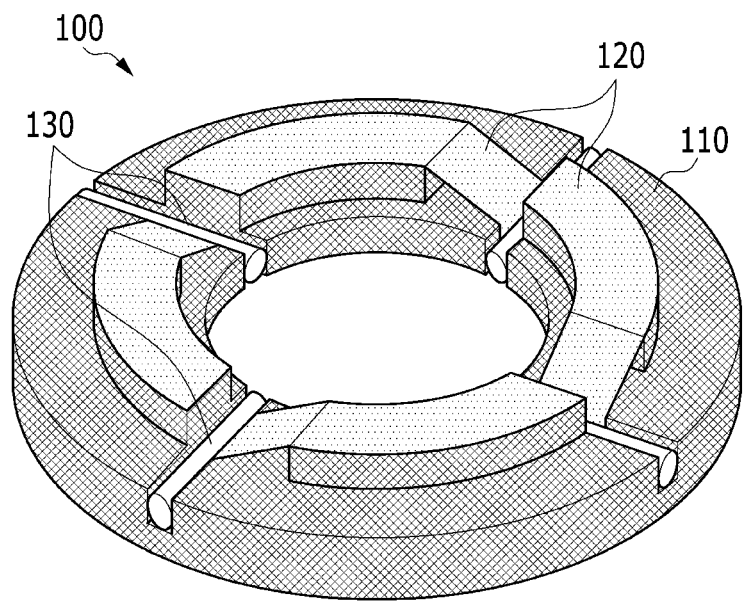
FIGS. 1A and 1B are a perspective view and a plan view, respectively, of a metal mesh foil thrust bearing according to a first exemplary embodiment of the present invention.
Figure 1B:
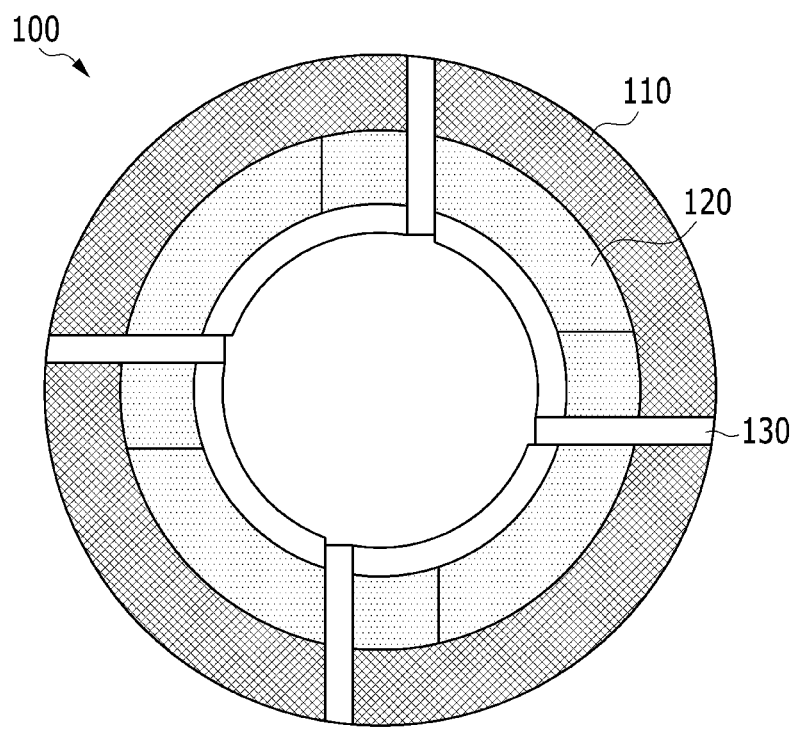
Figure 2:
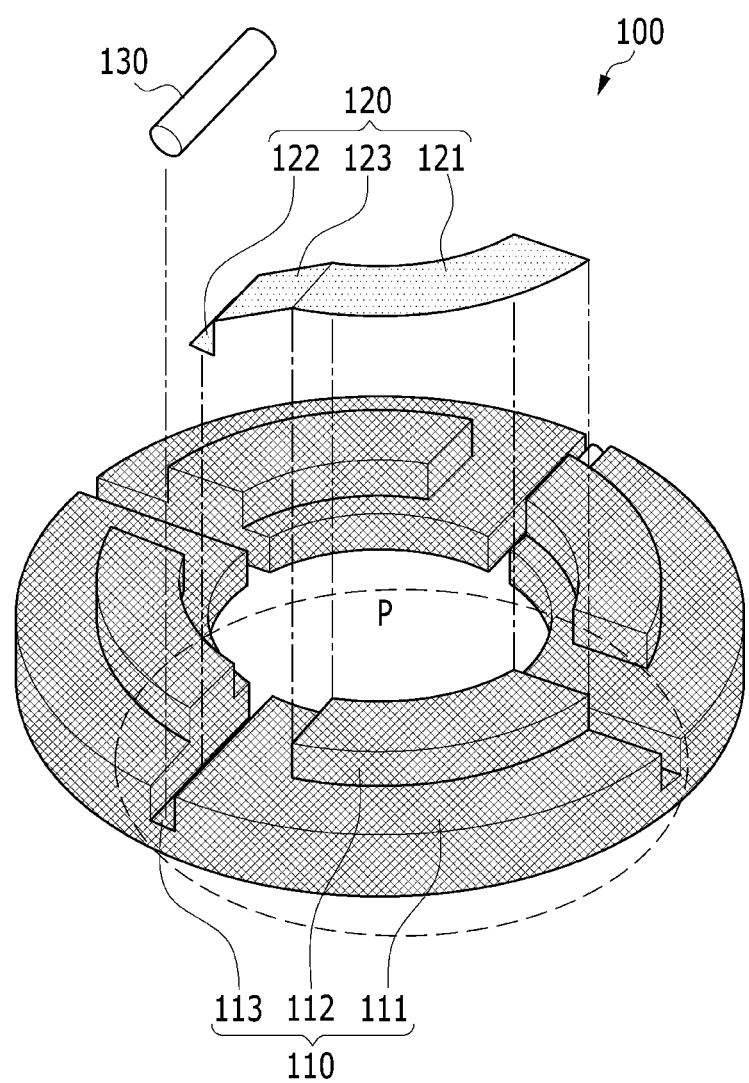
FIG. 2 is an exploded perspective view of the metal mesh foil thrust bearing according to the first exemplary embodiment of the present invention.

FIGS. 1A, 1B, and 2 are a perspective view, a plan view, and an exploded perspective view, respectively, of a metal mesh foil thrust bearing according to a first exemplary embodiment of the present invention.

Referring to FIGS. 1A, 1B, and 2, a metal mesh foil thrust bearing 100 according to the present exemplary embodiment basically includes a damper body 110 and thrust top foils 120.

The damper body 110, as shown in FIG. 2, has a body part 111, protrusions 112, and grooves 113. The protrusions 112 protrude upward with flat tops at some areas on the body part 111, and the grooves 113 are recessed on one side of the body part 111. The damper body 110 may be implemented by circumferentially arranging at least two unit collars P composed of the body part 111, the protrusion 112, and the groove 113. Although four unit collars P are shown in FIG. 2, this is just an example and the number of unit collars P is not limited.

The thrust top foil 120 is formed by bending a thin plate with a contact portion 121, a connecting portion 123, and a fixing portion 122 sequentially connected. The contact portion 121 is in surface contact with the top of the protrusion 112, and is exposed in the rotation axis direction of a rotator to be supported by the thrust bearing 100. The surface of the contact portion 121 is coated to decrease the frictional coefficient and generate air pressure, such that non-contact rotation can be achieved. The principle of generating non-contact rotation by air pressure on a thrust top foil is similar to the principle of an air foil thrust bearing, so it is not described herein. The fixing portion is inserted and fixed in the groove 113, combining the thrust top foil 120 with the damper body 110. The connecting portion 123, which connects the contact portion 121 and the fixing portion 122, may be appropriately bent to fit the shape of the damper body 110.

In the present exemplary embodiment, the damper body 110 is made of a metal mesh. In the air foil thrust bearings of the related art, a bump foil is disposed under a top foil. However, as described above, since bump foils are formed by making prominences and depressions on a thin plate to function as an elastic body, the durability is very poor, such that they are not suitable for bearings supporting high-speed heavy rotators. Further, since there is a drawback that it is difficult to form a bump shape in a small area, there are considerable limits in reduction of size and weight of bearings.

However, in the present exemplary embodiment, it is possible to eliminate the bump foils of the air foil thrust bearings of the related art and make the damper body 110, which is made of metal mesh, function as an elastic body instead of using the bump foil. The metal mesh, which is a material in which metal wires are woven as a mesh, has elasticity and high durability. The damper body 110 made of a metal mesh supports axial loads and absorbs axial vibration. The portions where the contact portions 121 of the thrust top foils 120 are in surface contact with the protrusions 112 of the damper body 110 are the shaft-supporting portions, and, unlike the configuration with bump foils having poor durability disposed under thrust top foils in the related art, the protrusions 112 made of a metal mesh are disposed under the thrust top foils 120 in the present exemplary embodiment, such that a thrust bearing with excellent durability in comparison to the related art can be achieved.

Further, there is an advantage that the shape of the metal mesh can be machined, for example, by a press. That is, even if the shape of the damper body 110 is somewhat complicated, it is possible to manufacture the damper body 110 by appropriately shaping a piece of metal mesh without a need of forming the shape of the damper body 110 by assembling several parts, such that the manufacturing process is simplified and the number of parts is considerably reduced. Further, as manufacturing becomes easy and the numbers of parts and assembly processes are reduced, it is possible to far more reduce the size and the weight of a thrust bearing, as compared with the related art. Accordingly, the present invention has a large advantage in that it can be used for small devices such as the gas microturbine of the related art, in which it is difficult to use thrust bearings.

As described above, since the thrust bearing 100 of the present invention can be basically made of two parts, that is, the damper body 110 and the thrust top foil 120, the number of parts is significantly reduced, as compared with the related art. Accordingly, the assembly process can be considerably simplified.

In the present exemplary embodiment, the damper body 110 and the thrust top foil 120 are combined by combining the groove 113 and the fixing portion 122. The fixing portion 122 may be fitted into the groove 113, or inserted into the groove 113 and then bonded thereto. When the fixing portion 122 is fitted in the groove 113, the fixing portion 122 may be bent in an appropriate shape to increase the fixing force. In this case, there is no need of a specific part, so the thrust bearing 100 can be achieved by a minimum number of parts.

The thrust bearing 100 may further include fixing pins 130 to more firmly combine the damper body 110 and the thrust top foils 120. The fixing pins 130 are, as shown in FIGS. 1A, 1B, and 2, fitted in the grooves 113 to support the fixing portions 122 in the grooves 113. The fixing pin 130 can have any shape, as long as it can be fitted into the groove 113. Further, the assembly process has only to simply press the fixing pin 130 into the groove 113, so even if the fixing pins 130 are additionally provided, the assembly process is still simple in comparison to the related art.

Figure 3A:
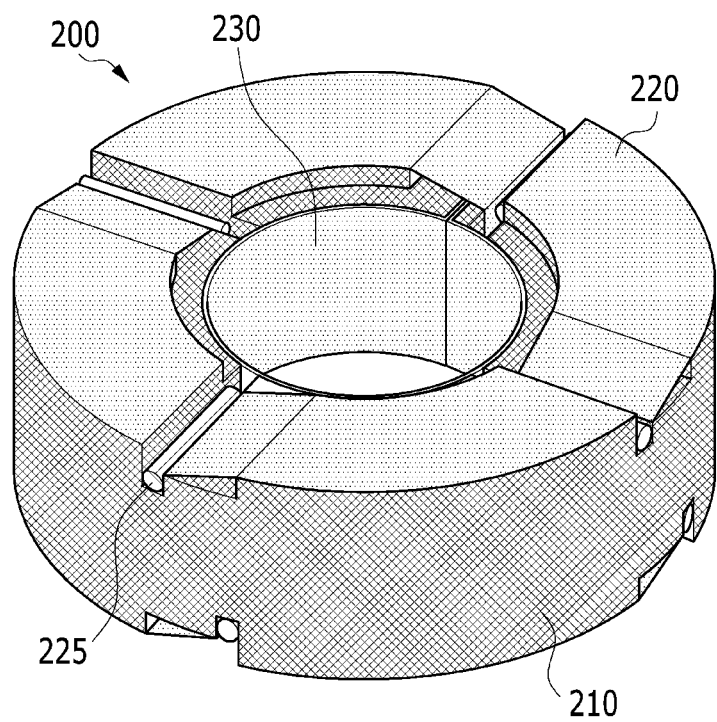
FIGS. 3A and 3B are a perspective view and an exploded perspective view, respectively, of a combo metal mesh foil bearing according to a second exemplary embodiment of the present invention.
Figure 3B:
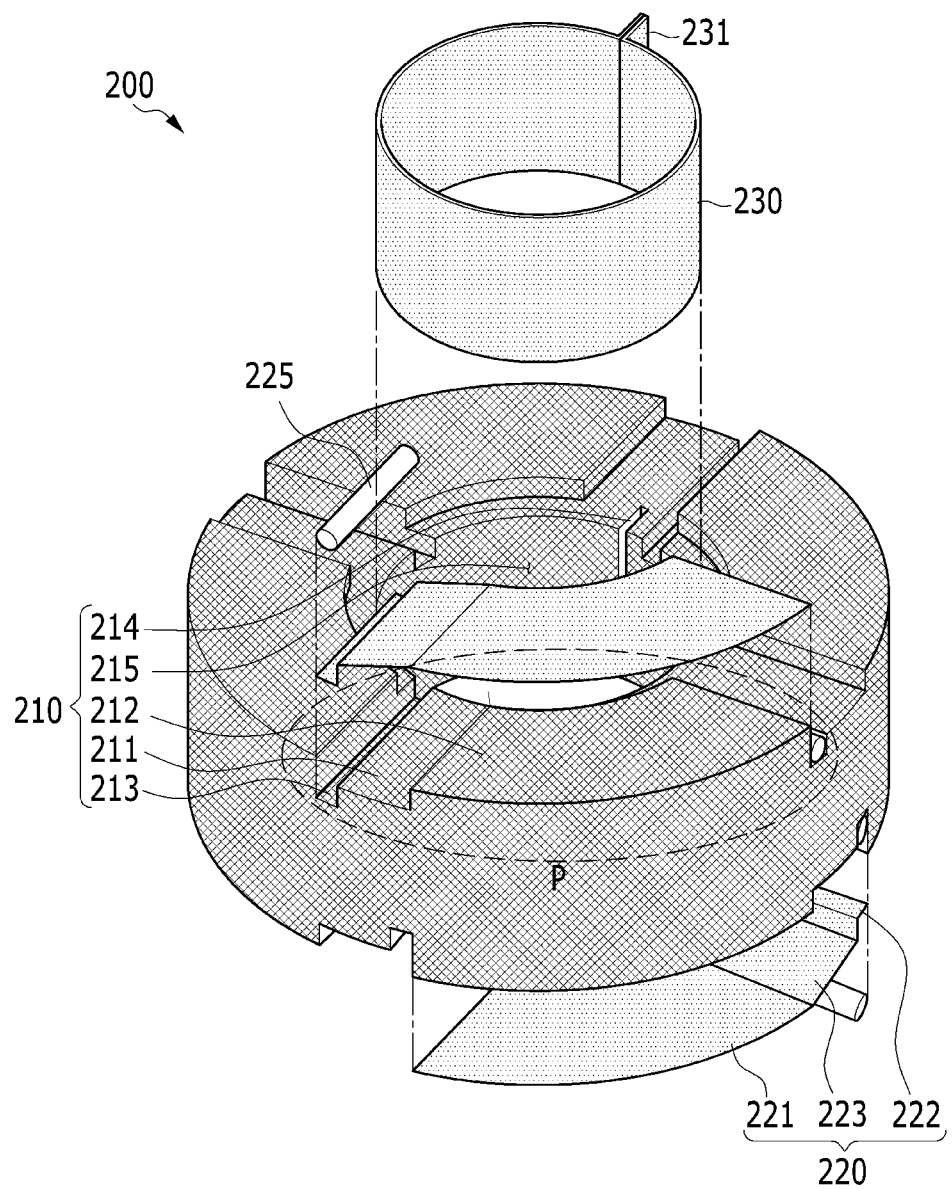
Figure 4:
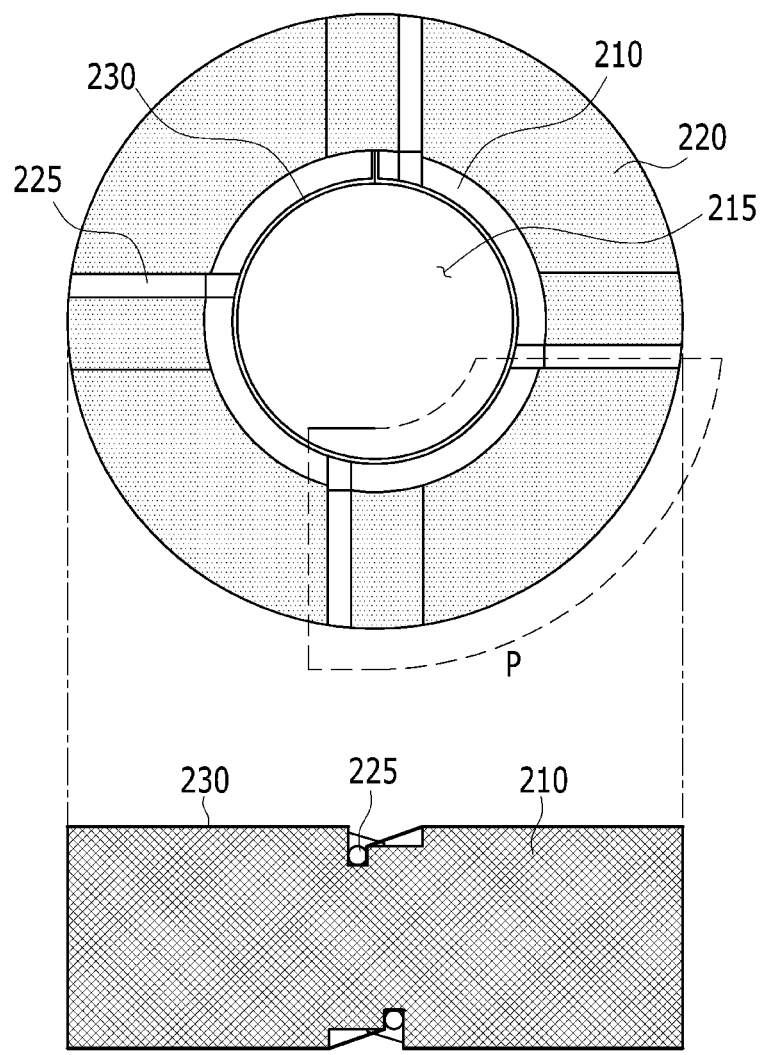
FIG. 4 is a plan view and a side view showing the combo metal mesh foil bearing according to the second exemplary embodiment of the present invention.

FIGS. 3A and 3B are a perspective view and an exploded perspective view, respectively, of a combo metal mesh foil bearing according to a second exemplary embodiment of the present invention, and FIG. 4 shows a plan view and a side view.

Referring to FIGS. 3A, 3B, and 4, a combo metal mesh foil bearing 200 according to the present exemplary embodiment basically includes a damper body 210, thrust top foils 220, and a radial top foil 230.

The damper body 210 is made of a metal mesh, and as shown in FIG. 3B, includes a body part 211, protrusions 212, grooves 213, a slot 214, and a through-hole 215. The through-hole 215 through which the rotary shaft of a rotator passes is formed at the center of the body part 211. The protrusions 212 axially protrude with the flat tops at predetermined areas on the body part 211. The grooves 213 are axially recessed on a side of the body part 211, and the slot 214 is radially recessed from the through-hole 215. The grooves 213 are structures for fixing the thrust top foil 220, and the slot 214 is a structure for fixing the radial top foil 230.

The damper body 210 may be implemented by circumferentially arranging at least two unit collars P composed of the body 211, the protrusion 212, and the groove 213. Although four unit collars P are shown in FIG. 4, this is just an example, and the number of unit collars P is not limited. Further, the damper body 210 may be implemented by axially forming the unit collars P composed of the body part 211, the protrusion 212, and the groove 213 on at least one side. Although the unit collars P are formed on both axial sides, that is, the top and the bottom of the bearing 200 in the present exemplary embodiment, the unit collar P may be formed on only axial one side, that is, the top or the bottom of the bearing 200. Further, although the same number, four, of unit collars P are formed symmetrically on the top and bottom of the bearing 200 in the present exemplary embodiment, the number of unit collars P or the sides where the unit collars P are formed is not limited.

For example, six unit collars P may be formed only on the top of the bearing 200; unit collars P may be formed on the top and the bottom of the bearing 200, with four on the top and six on the bottom; or the same number of unit collars P may be formed on the top and the bottom of the bearing 200 while having phase differences (that is, the bottom has the same shape as the top, but is turned at a predetermined angle when seen from above). That is, the configuration of the unit collars may be changed in various ways in accordance with the user's purpose or demand, which is also included in the present invention.

The damper body 210 is made of a metal mesh. In the air foil bearings of the related art, a bump foil is disposed under a top foil. However, since bump foils are formed by making prominences and depressions on a thin plate to function as an elastic body, the durability is very poor, such that they are not suitable for bearings supporting high-speed heavy rotators. Further, since there is a drawback that it is difficult to form a bump shape in a small area, there were considerable limits in reduction of size and weight of bearings.

However, in the present exemplary embodiment, the bump foils of the air foil bearings of the related art are eliminated and the damper body 210, which is made of metal mesh, functions as an elastic body instead of the bump foil. The metal mesh, which is a material in which metal wires are woven in a mesh type, has elasticity and high durability. The damper body 210 made of a metal mesh supports the load that the bearing 200 supports, and absorbs vibration. Portions where contact portions 221 of the thrust top foils 220 are in surface contact with the protrusions 212 of the damper body 210 are the thrust shaft-supporting portions, the portion where the inner side of the radial top foil 230 is in surface contact with a rotary shaft of a rotator is the radial shaft-supporting portion, and, unlike the configuration with bump foils having poor durability disposed under top foils in the related art, the damper body 210 made of a metal mesh is disposed under the top foils 220, such that a bearing with excellent durability in comparison to the related art can be achieved.

Further, there is the advantage that the shape of the metal mesh can be machined, for example, by a press. That is, even if the shape of the damper body 210 is somewhat complicated, it is possible to manufacture the damper body 210 by appropriately shaping a piece of metal mesh without a need to form the shape of the damper body 110 by assembling several parts, such that the manufacturing process is more simplified and the number of parts is considerably reduced. Further, as manufacturing becomes easy and the numbers of parts and assembly processes are reduced, it is possible to far more reduce the size and the weight of a bearing, as compared with the related art. Accordingly, the present invention has a large advantage that it can be used for small devices such as the gas microturbine in the related art, in which it is difficult to use bearings.

The thrust top foil 220 is formed by bending a thin plate with the contact portion 221, a connecting portion 223, and a fixing portion 222 sequentially connected. The contact portion 221 is in surface contact with the top of the protrusion 212, and is the thrust contact side exposed to the shaft to be supported by the bearing 200. The surface of the contact portion 221 is coated to decrease the frictional coefficient and generate air pressure, such that non-contact rotation can be achieved. The fixing portions 222 are inserted and fixed in the grooves 213 to combine the top foils 220 with the damper body 210. The connecting portion 223, which connects the contact portion 221 and the fixing portion 222, may be appropriately bent to fit the shape of the damper body 210.

In the present exemplary embodiment, the damper body 210 and the top foil 220 are combined by combining the groove 213 and the fixing portion 222. The fixing portion 222 may be fitted into the groove 213, or inserted into the groove 213 and then bonded thereto. When the fixing portion 222 is fitted in the groove 213, the fixing portion 222 may be bent in an appropriate shape to increase the fixing force. In this case, there is no need for a specific part, so the thrust bearing 200 can be achieved with a minimum number of parts.

The thrust bearing 200 may further include fixing pins 225 to more firmly combine the damper body 210 and the top foils 220. The fixing pins 225 are, as shown in FIG. 4, fitted in the grooves 213 to support the fixing portions 222 in the grooves 213. The fixing pins 225 can have any shape, as long as they can be fitted into the groove 213. Further, the assembly process only has to simply press the fixing pin 225 into the groove 213, so even if the fixing pins 225 are additionally provided, the assembly process is still simple in comparison to the related art.

The radial top foil 230 is formed by bending a thin plate, and surrounds the rotary shaft of a rotator and is disposed between the outer side of the rotary shaft and the inner side of the through-hole 215 of the damper body 210. In detail, the radial top foil 230 has a substantially circular cross-section to surround the rotary shaft, not in a fully closed loop, but with one end forming an insert 231 that is fitted and fixed in the slot 214 of the damper body 210. Obviously, since the radial top foil 230 has a substantially circular cross-section with an open portion, it can be disposed at any desired position on a rotary shaft, even if complicated protruding parts such as an impeller are formed around the rotary shaft.

The inner side of the radial top foil 230 is the radial contact surface exposed to the outer side of a rotary shaft to be supported by the bearing 200, and it is possible to achieve non-contact rotation by coating the inner side of the radial top foil 230 to reduce the frictional coefficient and generate air pressure. The principle of implementing non-contact rotation by generating air pressure on the radial top foil is similar to the principle of the air foil radial bearing and is not described herein.

Although the slot 214 for fixing the radial top foil 230 to the damper body 210 is formed in a narrow groove with the same thickness as the radial top foil 230 in the figure, the slot 214 may also be formed in a similar way to the groove 213 for fixing the thrust top foils 220 to the damper body 210. That is, the slot 214 can be modified, and for example, it may also be a slot as wide as the groove 213, in which the insert 231 of the radial top foil 230 may be inserted into the slot 214 and then firmly fixed to the slot 214 by a fastener such as a fixing pin.

As described above, since the combo metal mesh foil bearing 200 of the present exemplary embodiment is composed of the damper body 210, the thrust top foils 220, and the radial top foil 230, it can achieve the functions of a thrust bearing and the radial bearing as a single part. How the combo metal mesh foil bearing 200 of the present exemplary embodiment supports the thrust and radial loads and reduces vibration is described hereafter.

Figure 5A:
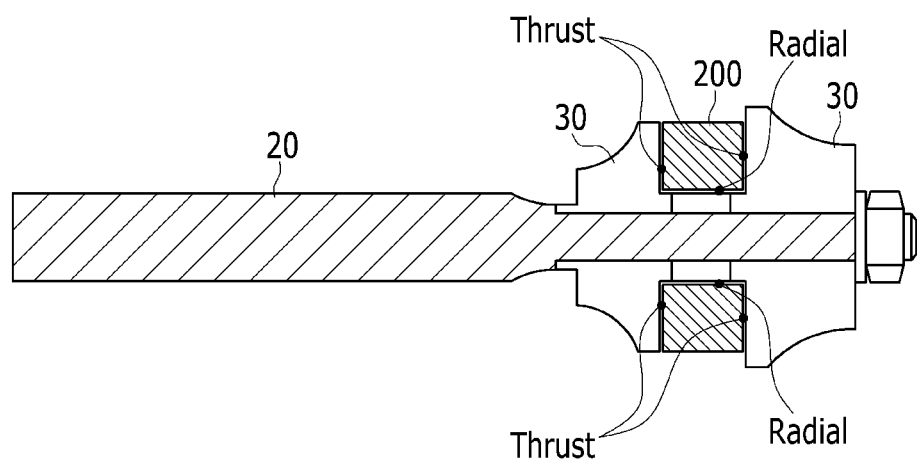
FIGS. 5A and 5B are views schematically showing the arrangement of the combo metal mesh foil bearing according to the second exemplary embodiment of the present invention, on a rotary shaft combined with impellers.
Figure 5B:
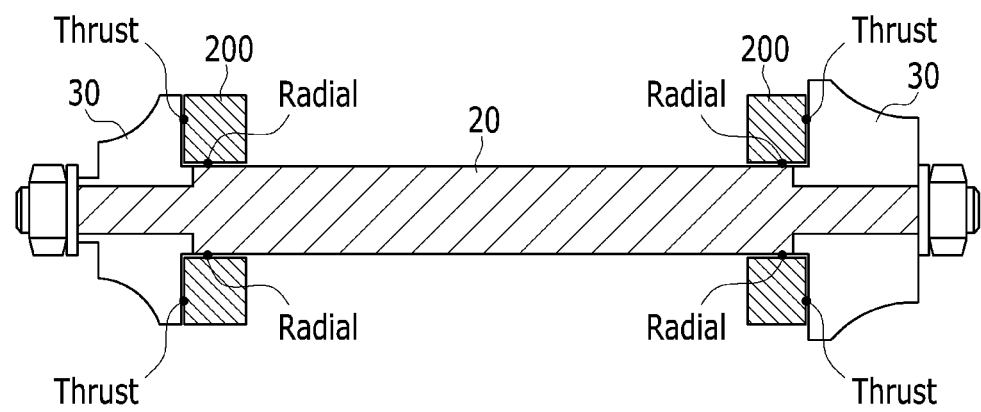

FIGS. 5A and 5B are views showing the arrangement of the combo metal mesh foil bearing described above in accordance with the second exemplary embodiment of the present invention, on a rotary shaft combined with impellers. FIGS. 5A and 5B show examples with two or more impellers 30 combined with a rotary shaft 20 of a rotator.

Referring to the example shown in FIG. 5A first, two impellers, for example turbine impellers or compressor impellers, are fitted on the rotary shaft 20. When the combo metal mesh foil bearing 200 of the present exemplary embodiment is disposed between the impellers 30, the thrust sides of the bearing 200 are in contact with the axial sides of the impellers 30 and the radial side of the bearing 200 is in contact with the outer side of the rotary shaft 20. That is, as the impellers 30 are in contact with the thrust sides of the bearing 200, the bearing 200 can support the axial load on the assembly of the rotary shaft 20 and the impellers 30 and absorb the axial vibration. Further, as the impellers 20 are in contact with the radial sides of the bearing 200, the bearing 200 can support the radial load on the assembly of the rotary shaft 20 and the impellers 30 and absorb the radial vibration.

As described above, since it was necessary to dispose a radial bearing and a thrust bearing, which are separate parts, on a rotary shaft in the related art, there was a problem in that more space for the bearings is needed and the volume of the system increases. Further, the rotary shaft is required to be long enough to mount two different types of bearings, such that the rotary shaft is increased in length, and when the rotary shaft is increased in length, the rotary shaft is more likely to be bent and the critical speed that is a speed limit at which the rotary shaft can stably rotate in a bending mode is decreased. Therefore, there is a problem in that the range of operation speed in which the rotary shaft can stably rotate is decreased.

However, the bearing 200 of the present exemplary embodiment, as shown in FIG. 5A, can perform the functions of both a radial bearing and a thrust bearing as a single part, such that there is no need to provide separate bearings. That is, since there is only a need to provide the bearing of the present exemplary embodiment which is a single part, it is possible to far more reduce the volume of the system and the length of the rotary shaft, such that it is possible to increase usability of a space and reduce the length of the rotary shaft as much as possible. Obviously, as the length of the rotary shaft is minimized, bending or imbalance of the rotary shaft is more reduced, and accordingly, the critical speed range of the rotary shaft is increased, such that the range of operation speed at which the rotary shaft can stably rotate increases.

The bearing 200 of the present exemplary embodiment is usable not only for the rotator in which impellers and a rotary shaft are combined in the related art, but also in an impeller-rotary shaft-integrated rotator described above. An impeller-rotary shaft-integrated rotator is briefly described below.

Figure 6:
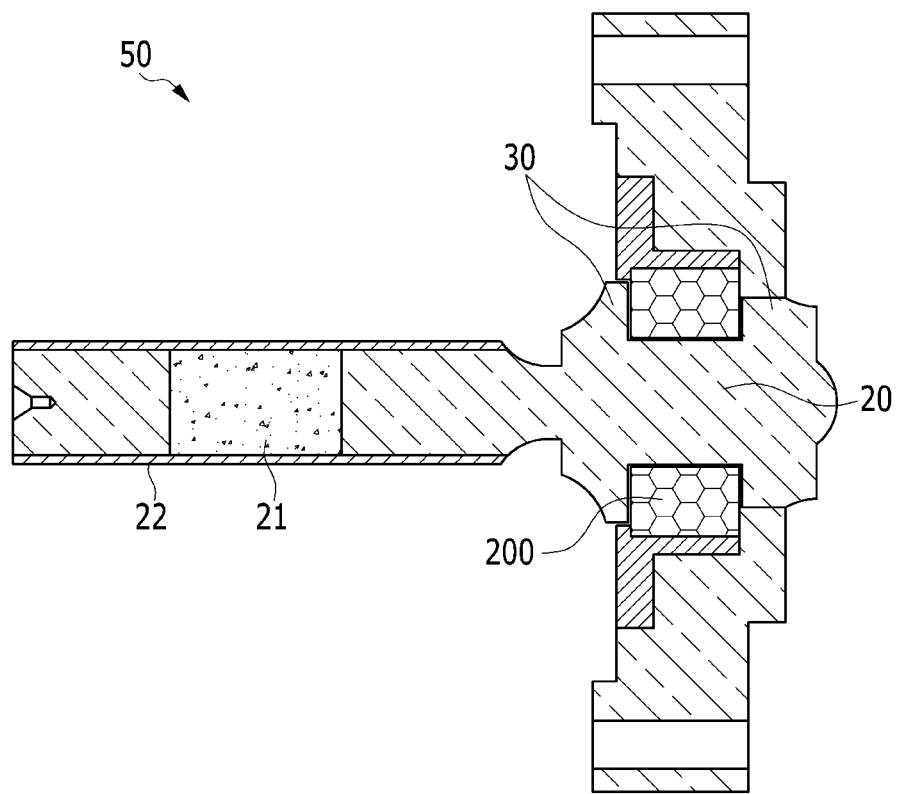
FIG. 6 is a cross-sectional view schematically showing the arrangement of the combo metal mesh foil bearing according to the second exemplary embodiment of the present invention, on an impeller-rotary shaft-integrated rotator.

FIG. 6 shows an impeller-rotary shaft-integrated rotator and a bearing according to the exemplary embodiment. As shown in FIG. 6, the impeller-rotary shaft-integrated rotator 50 has a structure in which the rotary shaft 20 and at least one or more impellers 30 are integrated. In detail, FIG. 6 exemplifies an impeller-rotary shaft-integrated rotator 50 that is used in gas microturbines for power generation, in which the left impeller 30 is a compressor impeller, the right impeller 30 is a turbine impeller, the rotary shaft 20 and the impellers 30 are integrated, a magnetic body 21 is disposed in a portion of the long extending portion of the rotary shaft 20, and a sleeve 22 covers the extending portion.

There is no need of specific assembly in the impeller-rotary shaft-integrated rotator 50, because the rotary shaft 20 and the impellers 30 are integrated. However, as shown in FIG. 6, the bearing 200 is supposed to be disposed between the impellers 30, but it cannot be disposed at a desired position because the rotary shaft 20 and the impellers 30 are integrated. As is well-known in the art, radial bearings are usually formed in hollow cylinder shapes close to a disc shape and rotary shafts are usually formed in bar shapes with constant diameters, so when those radial bearings are assembled with a rotary shaft, the bearings are disposed at desired positions in a way of fitting the bearings onto one end of the rotary shaft and then pushing them. However, as shown in FIG. 6, in the impeller-rotary shaft-integrated rotator 50, when the bearing 200 is disposed between the impellers 30, the bearing 200 is stopped by the impellers 30, even though fitted and pushed in any directions, so it is impossible to dispose the bearing at a desired position.

Figure 7A:
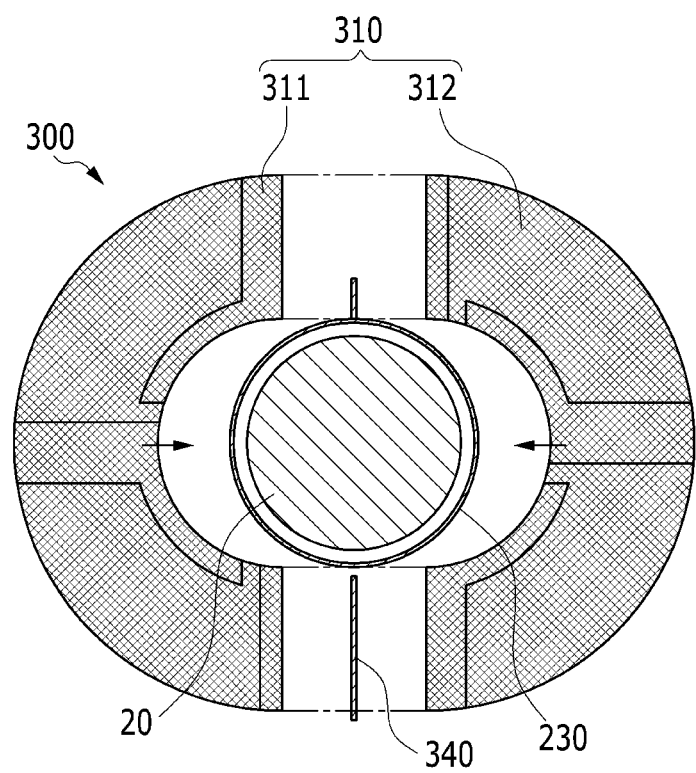
FIGS. 7A and 7B are views showing a combo metal mesh foil bearing according to a third exemplary embodiment of the present invention.
Figure 7B:
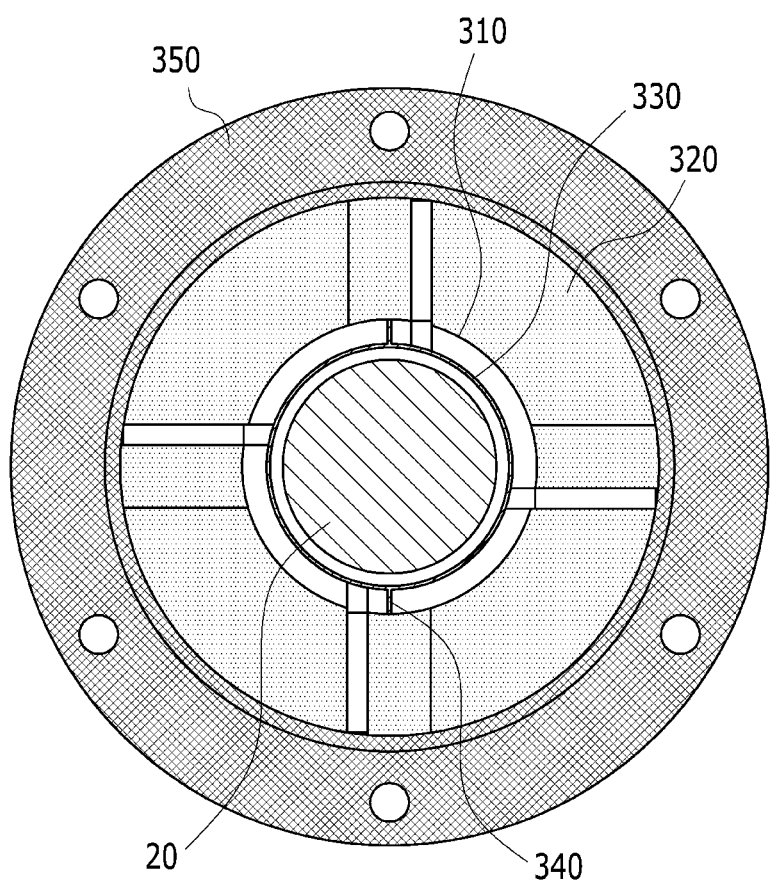
Figure 8A:
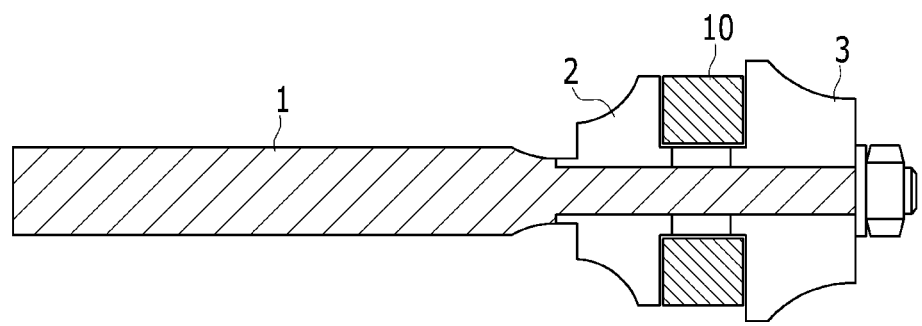
FIGS. 8A and 8B are views schematically showing the arrangement of a bearing on a rotary shaft combined with impellers of the related art.
Figure 8B:
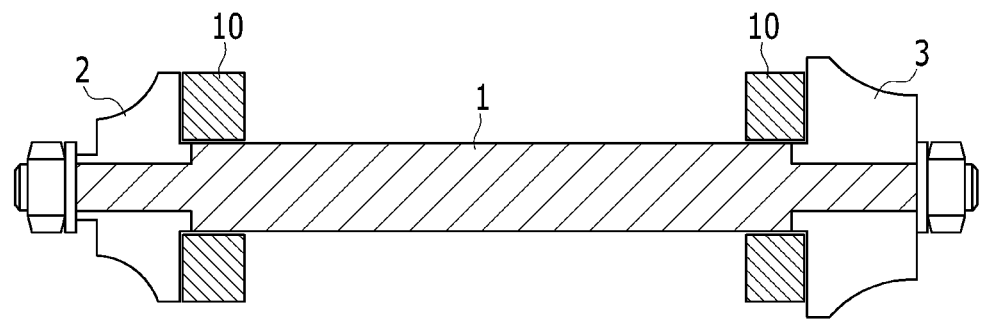

FIGS. 7A and 7B are views showing a combo metal mesh foil bearing according to a third exemplary embodiment of the present invention, and a structure that allows a bearing to be easily disposed at the positions where bearings cannot be disposed in the existing ways because rotators have a complicated shape, as in FIG. 6, is provided.

A damper body 310, which surrounds the rotary body 20, is composed of two or more separate parts 311 and 312 that are radially divided in the present exemplary embodiment. The damper body 310 is made of a metal mesh in the present exemplary embodiment, so there is no difficulty in making and keeping the shape. For example, for the ball bearings and the electromagnetic bearings of the existing bearings, when the separate structure is used, the parts of the bearings cannot be stably fixed, so they may fall out or may have difficulty in supplying power or in control, such that it is impossible to introduce the separate structure. However, for the bearing 300 of the present exemplary embodiment, the separate parts 311 and 312 of the damper body 310 are simple pieces of a metal mesh, the shapes can be freely formed, and other specific parts are not required, such that the separate structure can be freely introduced for the bearing 300 of the present exemplary embodiment.

The existing bearings are fitted on one end of rotary shafts and then pushed to desired positions, but in the present exemplary embodiment, since the damper 310 is composed of the separate parts 311 and 312, the damper body 310 can be combined by mounting the separate parts 311 and 312 at a desired position directly from radially outside of the rotary shaft 20. Accordingly, even if the rotary shaft 20 has a complicated shape around the outer side, there is no difficulty in combining the bearing 300 of the present invention with the rotary shaft 20 at any desired positions.

The separate parts 311 and 312 can be achieved by dividing the damper body 30 into two parts, and as show in the figures, the damper body 30 may be divided into two or more parts as necessary. It is preferable to divide the damper body 310 into two parts in order to simplify the structure and assembly of the bearing, but in a specific case, for example when the damper body 310 is to be combined with a rotator having a very complicated shape and it is difficult to ensure a space for work, the damper body 310 may be divided into more than two parts to solve this condition.

When the damper 310 is divided into two or more parts 311 and 312, as described above, the bearing 300 further includes a housing 350, as shown in FIG. 7B. The housing 350 covers the rotary shaft 20 and accommodates the damper body 310, thrust top foils 320, and a radial top foil 330. Even if the damper 310 is not divided (second exemplary embodiment), the housing may be provided to strongly protect the structure of the bearing and stably and easily combine the bearing with other parts.

The housing 350 may also be divided. That is, the housing 350 may also be composed of two or more parts, which may be combined by bolts. However, considering the problems of imbalance and efficiency of reducing vibration, it is preferable that the housing 350 is a single unit, as shown in the figure. As described above, the rotary shaft 20 may be the rotary shaft of the impeller-rotary shaft-integrated rotator 50 in which the rotary shaft 20 and at least one or more impellers 30 are integrated. In this case, when the inner diameter of the housing 350 is smaller than the impellers 30, the housing 350 cannot be assembled (due to the same problem when assembling the existing bearings of the related art). Accordingly, in this case, the outer diameter of the damper body 310 and the inner diameter of the housing 350 are required to be increased to larger than the outer diameters of the impellers 30. Although the damper body 310 and the top foils 320 should be disposed substantially in close contact with the rotary shaft 20, the housing 350 does not have to be disposed in this way, so there is no limit or problem in making the inner diameter of the housing 350 larger than the outer diameters of the impellers 30.

The housing 350 may be formed in a ring to be able to simply receive and fix the damper body 310 etc., and a structure such as a flange that radially further protrudes to fix the bearing 300 to other parts, as shown in FIGS. 7A and 7B, may be further formed. In FIG. 7B, a plurality of holes are formed through the flange on the housing 350 to be coupled to other parts by bolts, but FIG. 7B just shows an example, and the housing 350 may be formed in any shapes as long as it can receive and stably fix the damper body 310 etc.

Further, when the damper body 310 is divided into two or more parts 311 and 312, the slot 314 formed on the damper body 310 to fit and fix the insert 331 of the radial top foil 330 in the damper body 310 may be separately formed, but it is not necessarily so, and the gaps between the separate parts 311 and 312 may function as the slot 314.

In addition, the bearing 300 of the present exemplary embodiment may further include a gap filler 340, as shown in FIGS. 7A and 7B. The gap filler 340 is a thin plate and is fitted in the gap where the insert 331 is not fitted, of the gaps between the separate parts 311 and 312. The damper body 310 may be divided into the separate parts 311 and 312 by forming a metal mesh first in a shape similar to a disc with a hole at the center, and then cutting the metal mesh with a wire that is the same in thickness as the radial top foil 330, in manufacturing. However, when the separate parts 311 and 312 are combined and the damper body 310 is assembled without the gap filler 340, the other gap except for the gap where the insert 331 is fitted (that is, the gap that functions as the slot 314) is left as an empty space in the housing 350. The empty space may allow that separate parts 311 and 312 to move in the housing 350, or the separation parts 311 and 312 may be deformed, for example by crushing in the empty space, such that the roundness may not be maintained.

However, the problems can be removed by fitting the gap filler 340 into the other empty gap. That is, the separate parts 311 and 312 can be stably disposed at fixed positions by the gap filler 340 and the roundness that is somewhat deteriorated can be compensated by the cut portions. In order to make the gap filler 340 carry out the function, it is preferable that the gap filler 340 is formed with the same thickness as the radial top foil 330 or made of the same material.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A thrust bearing that is mounted on a rotary shaft of a rotator and supports the rotary shaft in a parallel direction (axially), the thrust bearing comprising:
  a damper body including a body part and protrusions axially protruding at predetermined areas on the body part with the flat tops;

thrust top foils each having a contact portion that is in surface contact with the tops of the protrusions; and fixing pins fitted in the grooves to support the fixing portions in the grooves, wherein the damper body further includes grooves axially recessed on one side of the body part, and the thrust to foil further has a fixing portion inserted and fixed in the groove and a connecting portion connecting the contact portion and the fixing portion.

2. The thrust bearing of claim 1, wherein the damper body is formed by circumferentially arranging unit collars composed of the body part, the protrusion, and the groove, and the thrust top foils are provided at the same number as the unit collars.

3. The thrust bearing of claim 1, wherein the fixing portion is fitted and fixed in the groove or inserted and bonded in the groove.

4. The thrust bearing of claim 1, wherein the damper body is made of a metal mesh.

5. The thrust bearing of claim 1, wherein the thrust top foil is formed by bending a thin plate.

* * * * *